United States Patent
Iijima

(10) Patent No.: US 9,726,525 B2
(45) Date of Patent: Aug. 8, 2017

(54) ELECTROMAGNETIC FLOWMETER

(71) Applicant: Kabushiki Kaisha Toshiba, Minato-ku, Tokyo (JP)

(72) Inventor: Takuya Iijima, Ome Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/911,464

(22) PCT Filed: Jan. 15, 2014

(86) PCT No.: PCT/JP2014/050551
§ 371 (c)(1),
(2) Date: Feb. 10, 2016

(87) PCT Pub. No.: WO2015/022783
PCT Pub. Date: Feb. 19, 2015

(65) Prior Publication Data
US 2016/0195416 A1     Jul. 7, 2016

(30) Foreign Application Priority Data

Aug. 12, 2013   (JP) .................................. 2013-167790

(51) Int. Cl.
*G01F 1/58* (2006.01)
(52) U.S. Cl.
CPC .............. *G01F 1/584* (2013.01); *G01F 1/588* (2013.01)
(58) Field of Classification Search
CPC ...................................................... G01F 1/588
USPC ........................................ 73/861.11, 861.12
See application file for complete search history.

(56) References Cited

U.S. PATENT DOCUMENTS

| 7,137,307 | B2 * | 11/2006 | Huybrechts | G01F 15/006 73/861.12 |
| 8,082,803 | B2 * | 12/2011 | Iijima | G01F 1/58 73/861.11 |
| 8,120,370 | B2 * | 2/2012 | Harada | G01F 1/582 324/658 |
| 8,322,229 | B2 * | 12/2012 | Iijima | G01F 1/584 73/861.12 |
| 2003/0159522 | A1 | 8/2003 | Needham et al. | |

(Continued)

FOREIGN PATENT DOCUMENTS

JP   S59-87620 U   6/1984
JP   S60-65637 U   5/1985

(Continued)

OTHER PUBLICATIONS

International Search Report (English Translation and Japanese language) and Written Opinion (Japanese language only) dated Feb. 10, 2014 of PCT/JP2014/050551, which is the parent application—6 pages.

(Continued)

*Primary Examiner* — Jewel V Thompson
(74) *Attorney, Agent, or Firm* — Knobbe, Martens, Olson & Bear, LLP

(57) ABSTRACT

According to one embodiment, an electromagnetic flowmeter includes a tube, a lining, at least one protrusion, and a pair of electrodes. A fluid to be measured flows in the tube. The lining covers an inner surface of the tube. The protrusion protrudes from the inner surface and includes a hook for hooking the lining.

11 Claims, 9 Drawing Sheets

(56) References Cited

U.S. PATENT DOCUMENTS

2010/0089171 A1* 4/2010 Voigt .................. G01F 1/584
                                                   73/861.12
2011/0314931 A1* 12/2011 Iijima ................. G01F 1/588
                                                   73/861.12

FOREIGN PATENT DOCUMENTS

| JP | H06-174511 A | 6/1994 |
| JP | 2009-288026 A | 12/2009 |
| JP | 2012-008108 A | 1/2012 |

OTHER PUBLICATIONS

Decision to Grant a Patent mailed by Japan Patent Office on May 9, 2017 in the corresponding Japanese patent application No. 2013-167790.

* cited by examiner

ELECTROMAGNETIC FLOWMETER

CROSS-REFERENCE TO RELATED APPLICATIONS

This application is national stage application of International Application No. PCT/JP2014/050551, filed Jan. 15, 2014, which designates the United States, incorporated herein by reference, and which claims the benefit of priority from Japanese Patent Application No. 2013-167790 filed Aug. 12, 2013, the entire contents of which are incorporated herein by reference.

FIELD

Embodiments described herein relate generally to an electromagnetic flowmeter.

BACKGROUND

Conventionally, there has been known an electromagnetic flowmeter including a cylindrical porous plate and a tube, in which the plate and an inner surface of the tube are integrally covered with a lining.

In this kind of electromagnetic flowmeter, it is preferable to prevent the lining from being peeled off from the tube with a simpler configuration, for example.

DETAILED DESCRIPTION

In general, according to one embodiment, an electromagnetic flowmeter comprises a tube, a lining, at least one protrusion, and a pair of electrodes. A fluid to be measured flows in the tube. The lining covers an inner surface of the tube. The protrusion protrudes from the inner surface and includes a hook for hooking the lining.

Embodiments will now be described with reference to the accompanying drawings. Different embodiments described below include like or same components. Hereinafter, like or same numerals refer to like or same components, and redundant explanation will be omitted.

First Embodiment

Figure 1:
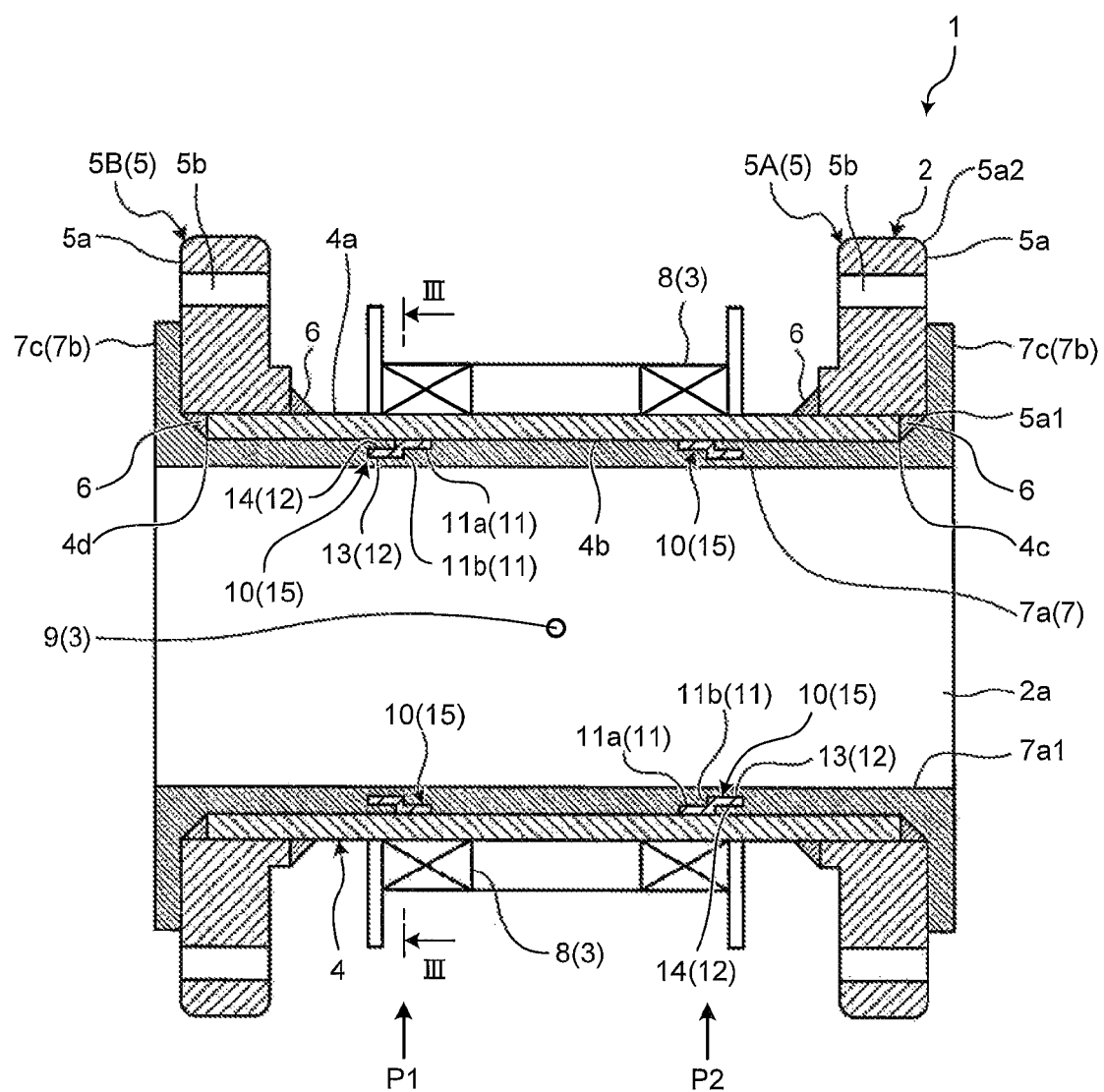
FIG. 1 is a sectional view illustrating an example of an electromagnetic flowmeter according to a first embodiment.

According to the embodiment, as an example, an electromagnetic flowmeter 1 includes a tube 2 and a detector 3 as illustrated in FIG. 1. A flow channel 2a in which a fluid to be measured flows is provided inside the tube 2 (inner side, axial center side of the tube 2 (measuring tube 4), inner side of the axial center of the tube 2 (the measuring tube 4) in a radial direction)). The detector 3 includes a pair of electrodes 9 and 9 (only one electrode illustrated in FIG. 1) contacting a fluid to be measured, and an excitation coil 8. A line connecting the electrodes 9 and 9 is orthogonal to the axial center of the tube 2 (measuring tube 4) (hereinafter simply referred to as axial center). The excitation coil 8 generates a magnetic field in a direction orthogonal to the line connecting the electrodes 9 and 9 and the axial center.

In the electromagnetic flowmeter 1, the excitation coil 8 generates a magnetic field inside the tube 2. When a fluid to be measured flows in a direction orthogonal to the magnetic field, electromotive force is generated in a direction orthogonal to the magnetic field and the fluid to be measured. The electrodes 9 and 9 detect the electromotive force generated by the fluid to be measured, and send a detection signal corresponding to the electromotive force to a controller (not illustrated). The controller calculates (detects) the magnitude (value) of the electromotive force from the detection signal. The controller calculates a flow rate from the calculated magnitude of the electromotive force and displays the flow rate on a display.

The tube 2 includes, as an example, the measuring tube 4 (tube), a flange 5, a lining 7, and protrusions 10 as illustrated in FIG. 1. The tube 2 can be connected to another tube (to be measured, not illustrated) in which a fluid to be measured flows. The detector 3 detects a flow rate of a fluid to be measured that flows from another tube to the tube 2.

The measuring tube 4 has, as an example, a cylindrical shape in a front view (as viewed from the axis direction). The measuring tube 4 includes an outer surface 4a (an outer peripheral surface, an outer side surface, a side surface opposite to the flow channel 2a, a first surface) and an inner surface 4b (an inner peripheral surface, an inner side surface, a surface on the flow channel 2a side, a second surface). The excitation coil 8 and the flange 5 are provided on the outer surface 4a. The electrodes 9 and 9, the lining 7, and the protrusions 10 are provided on the inner surface 4b. The measuring tube 4 also includes two ends 4c and 4d in the axis direction. The measuring tube 4 can be formed of, as an example, a non-magnetic material such as special use stainless steel (SUS).

The flange 5 has, as an example, an annular (ring) shape in a front view (as viewed from the axis direction). The flange 5 includes a first flange 5A at the end 4c of the measuring tube 4 and a second flange 5B at the end 4d of the measuring tube 4. The flange 5 (5A and 5B) can be fitted to (engaged with) the outer surface 4a of the measuring tube 4 and fixed by welding 6, for example. The flange 5 is not necessarily a separate member from the measuring tube 4 and may be integrally formed with the measuring tube 4. The flange 5 also includes an end surface 5a (a surface, a connection surface). The end surface 5a is a surface to be placed on (facing) an object to be joined (as an example, a flange of another tube connected to the tube 2). The end surface 5a can be joined with an object through an O-ring (a seal member, which is not illustrated). A through hole 5b (a mounting hole) is also provided to penetrate through the flange 5 along with the axis. The flange 5 can be formed of, as an example, a non-magnetic metal material such as special use stainless steel (SUS).

The lining 7 includes, as an example, a tubular portion 7a (a first part) and a flare 7b (a second part). The tubular portion 7a is formed in a tubular shape (in the embodiment, as an example, a cylindrical shape) along the inner surface 4b of the measuring tube 4, and integrally covers (coats) the inner surface 4b and the protrusions 10. An inner surface 7a1 (an inner side surface, an inner peripheral surface, a surface opposite to the measuring tube 4) of the tubular portion 7a forms the flow channel 2a. The flare 7b is formed in a circular shape (in the embodiment, as an example, plate-like and annular) along the end surface 5a of the flange 5 to cover (coat) the end surface 5a. The flare 7b protrudes as a flange from the axial end of the tubular portion 7a to a direction crossing the axis direction (in the embodiment, as an example, an orthogonal direction). The flare 7b can cover, as an example, an area of the end surface 5a from an end 5a1 (an inner end, an inner end in a radial direction) to a halfway point to an end 5a2 (an outer end, an outer end in a radial direction). In other words, in the embodiment, the flare 7b covers the end surface 5a from the end 5a1 to before the through hole 5b, therefore, the through hole 5b is open. The flare 7b further includes an end surface 7c. The end surface 7c is opposite to the end surface 5a of the flange 5 and forms an outer surface of the tube 2. Thus, the lining 7 is provided to extend over the inner surface 4b of the measuring tube 4 and the end surface 5a of the flange 5. The lining 7 protects the inner surface 4b of the measuring tube 4 and the end surface 5a of the flange 5 with the tubular portion 7a and the flare 7b. The lining 7 can be formed of, as an example, a synthetic resin material such as fluororesin.

Figure 2:
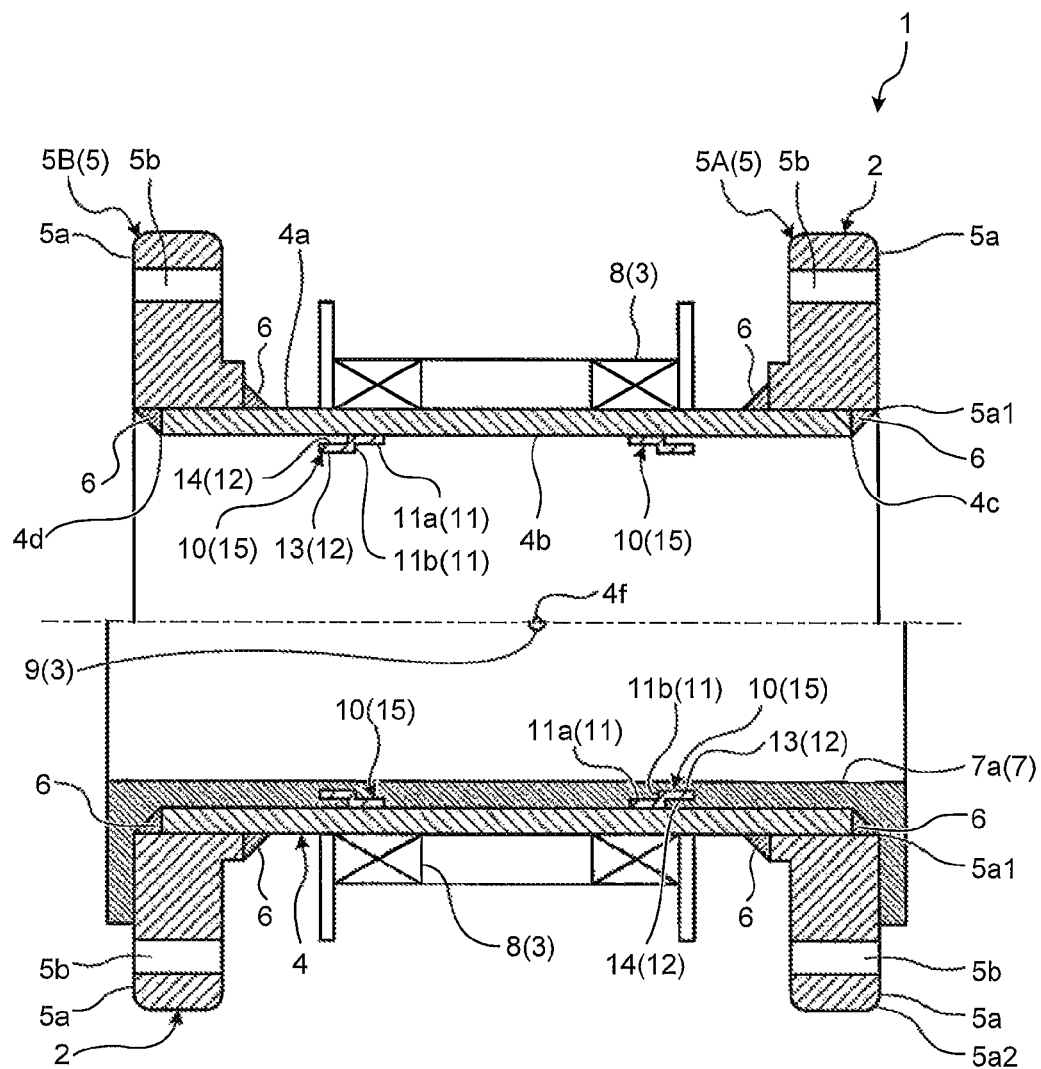
FIG. 2 is an explanatory view (sectional view) illustrating an example of the electromagnetic flowmeter where no lining is attached (upper half view) and where a lining is attached (lower half view) according to the first embodiment.
Figure 4:
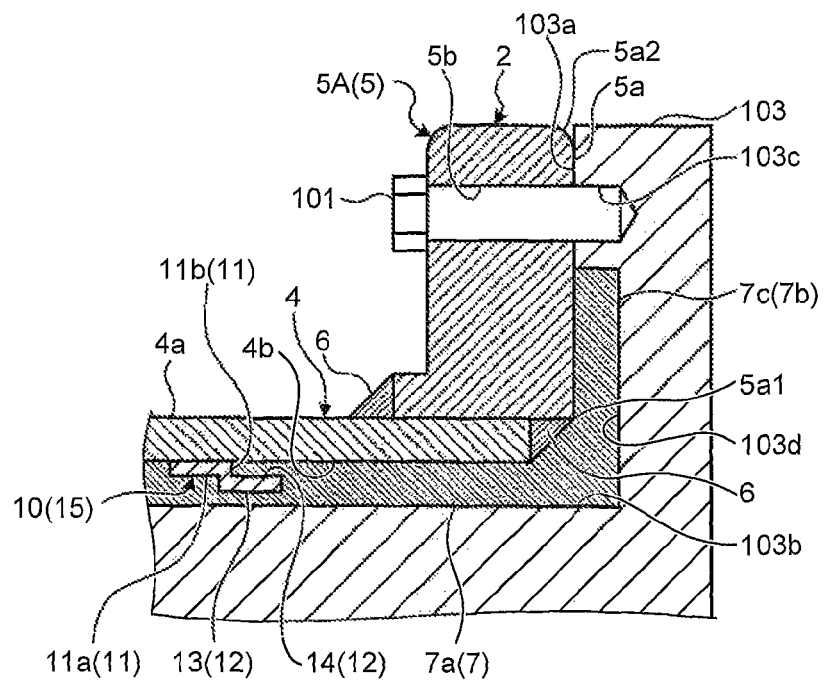
FIG. 4 is a view illustrating a part of an example of molding the lining of the electromagnetic flowmeter according to the first embodiment.

Each of the protrusions 10 is, as an example, substantially Z-shaped in a side view (as viewed from a direction connecting the electrodes 9 and 9) as illustrated FIGS. 1 and 4. Each of the protrusions 10 includes a base 11 (a first part) and a hook 12 (a second part). The base 11 includes a mount 11a attached on the inner surface 4b of the measuring tube 4 and a projection 11b projecting from the mount 11a to the inside (inner side, axial center) of the measuring tube 4. The base 11 is made of the mount 11a and the projection 11b in a substantial L shape. The hook 12 includes a protrusion 13. The protrusion 13 is provided at the tip (end close to the flow channel 2a, end close to the axial center) of the projection 11b and protrudes in a direction crossing the base 11 (projection 11b) (in the embodiment, as an example, an orthogonal direction, the axis direction substantially parallel to the inner surface 4b). In the embodiment, as an example, the protrusion 13 is disposed separately from the inner surface 4b of the measuring tube 4. In other words, a gap 14 (space, recess, cutout, aperture) surrounded by the inner surface 4b, the base 11, and the protrusion 13 is provided between the measuring tube 4 and the protrusion 13. At least a part of the lining 7 enters (intrudes into) the gap 14 as illustrated in FIGS. 1 and 2. The protrusion 13 and the gap 14 are one example of the hook 12. According to the embodiment, even when negative pressure occurs, at least a part (entering the gap 14) of the lining 7 is hooked on the hook 12. Thus, the lining 7 can be prevented from being peeled off from the inner surface 4b of the measuring tube 4. Negative pressure may occur in the measuring tube 4, for example, when a fluid to be measured is temporarily stopped from flowing.

The protrusions 10 each include, as an example, a different member 15 from the measuring tube 4, the member 15 being attached on the inner surface 4b of the measuring tube 4. The members 15 can be formed of, for example, a metal material such as stainless steel. The members 15 can be made of a flat plate-like member by processing as pressing or folding. Further, the members 15 can be attached on the inner surface 4b of the measuring tube 4 by welding (for example, spot welding or tig welding).

Figure 3:
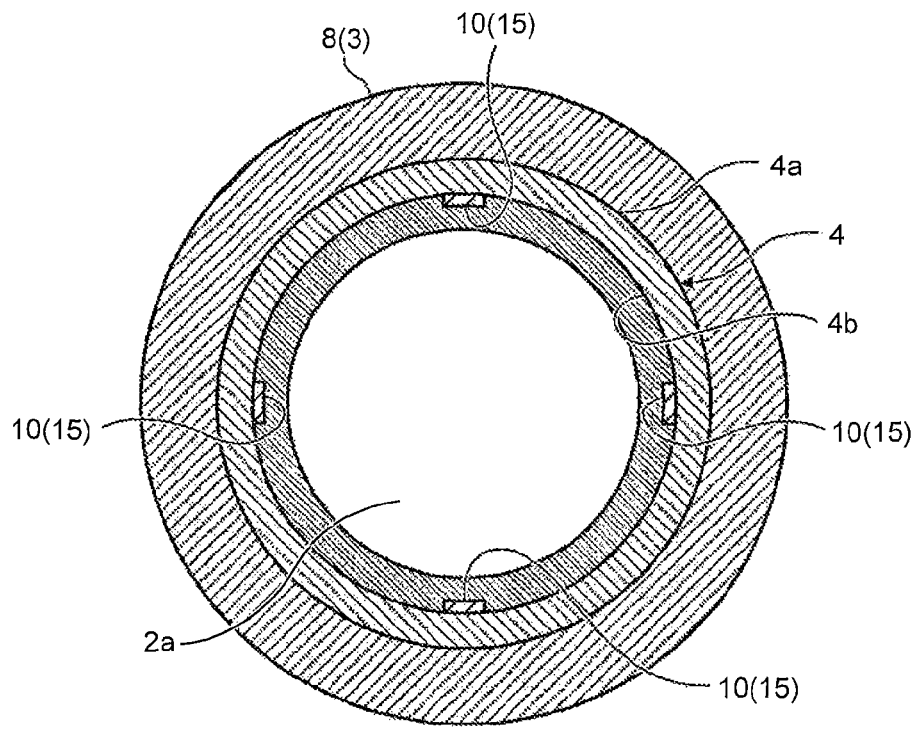
FIG. 3 is a sectional view along a line III-III in FIG. 1.

As an example, the protrusions 10 are disposed separately at four spots along the periphery of the measuring tube 4 in a front view of the measuring tube 4 (as viewed from the axis direction) as illustrated in FIG. 3. Specifically, the four protrusions 10 are arranged at equal intervals (at 90 degrees around the axial center) along the periphery of the measuring tube 4 on substantially the same cross section orthogonal to the axial center of the measuring tube 4. In the embodiment, as an example, a cross-sectional position P1 and a cross-sectional position P2 each of which the four protrusions 10 are provided are separated from each other in the axis direction, and the electrode pair 9 and 9 are provided between the two cross-sectional positions P1 and P2 as illustrated in FIG. 1.

In the embodiment, as an example, the lining 7 can be formed with a mold 103 (a mold member, a metal mold) as illustrated in FIG. 4. The mold 103 includes a surface 103a and a surface 103b. The surface 103a faces the end surface 5a of the flange 5. The surface 103b faces the inner surface 4b of the measuring tube 4. A screw hole 103c and a recess 103d are provided in the surface 103a. The recess 103d can form the end surface 7c of the flare 7b. The mold 103 is joined with the flange 5 by inserting a connector 101 (in the embodiment, as an example, a bolt) into the through hole 5b of the flange 5 and screwing (threadably mounting, engaging) it into the screw hole 103c. The mold 103 can be made of a plurality of members.

As an example, a material (in the embodiment, as an example, particulate pellets such as polytetrafluoroethylene (PTFE), fluororesin, and fluorocarbon resin) of the lining 7 is filled between the inner surface 4b of the measuring tube 4 and the end surface 5a of the flange 5, and the mold 103. The tube 2 and the mold 103 filled with the pellets are, for example, put in a furnace and are heated until the pellets are melted (dissolved). The tube 2 and the mold 103 including the gelled pellets are, for example, sandwiched and pressed by a press machine. By such a process the lining 7 can be molded. For applying pressure with the press machine, the connector 101 is removed from the mold 103 and the flange 5. The through hole 5b of the flange 5 can be used for joining the tube 2 and another tube other than joining the tube 2 and the mold 103.

As described above, in the embodiment, the protrusions 10 each including the hook 12 for the lining 7 is provided on the inner surface 4b of the measuring tube 4 (tube), as an example. According to the embodiment, as an example, the protrusions 10 having a relatively simple configuration can prevent the lining 7 from being peeled off from the measuring tube 4. Thus, as an example, the electromagnetic flowmeter 1 having a simpler configuration can be realized, reducing works and costs required for manufacturing the electromagnetic flowmeter 1.

In the embodiment, as an example, the hook 12 includes the protrusion 13 protruding in the direction crossing the base 11 (projection 11b) and disposed separately from the inner surface 4b of the measuring tube 4. According to the embodiment, as an example, the hook 12 and the protrusions 10 can be formed in a relatively simple shape, further reducing manufacturing costs. As an example, the lining 7 more easily enters (intrudes into) the hook 12 (gap 14) than the conventional measuring tube having a plurality of apertures inside. Accordingly, as an example, occurrence of bubbles can be prevented in the lining 7. According to the embodiment, as an example, the lining 7 is configured to easily enter (intrude into) the hook 12 (gap 14), whereby the lining 7 can be molded by a relatively easy and inexpensive molding (for example, a molding method using the pellets). Consequently, as an example, works and costs required for manufacturing or molding the lining 7 can be reduced.

In the embodiment, as an example, the protrusions 10 are formed by welding (attaching) the members 15 on the inner surface 4b of the measuring tube 4. According to the embodiment, as an example, efforts and cost for forming the protrusions 10 can be reduced.

In the embodiment, as an example, the protrusions 10 are disposed separately at least at three spots (in the embodiment, as an example, four spots) along the periphery of the measuring tube 4 in a front view of the measuring tube 4 (as viewed from the axis direction). According to the embodiment, as an example, the lining 7 is hooked on the hook 12 in a larger area of the measuring tube 4 (along the periphery). Thus, as an example, the lining 7 can be further prevented from being peeled off from the measuring tube 4.

In the embodiment, as an example, a number (in the embodiment, as an example, two pairs) of (four) protrusions 10 are provided separately from each other in the axis direction of the measuring tube 4. According to the embodiment, as an example, the lining 7 can be prevented from being peeled from the measuring tube 4 in a wider area in the axis direction.

In the embodiment, the four protrusions 10 are disposed at equal intervals along the periphery, however, three or five or more protrusions 10 can be disposed at equal intervals along the periphery. In the embodiment, the protrusions 10 are arranged along the periphery (on substantially the same cross section), however, the (three or more) protrusions 10 may be spirally disposed on the inner surface 4b of the measuring tube 4.

In the embodiment, each of the protrusions 10 is substantially Z-shaped in a side view (as viewed from the direction connecting the electrodes 9 and 9), however, each of the protrusions 10 may be made of a plate-like member of a substantial L-shape in a side view.

In the embodiment, the lining 7 is formed of granular pellets. However, the lining 7 can be formed by a method (for example, transfer molding, molding, or injection molding) for applying pressure to a melted (dissolved) synthetic resin material (for example, fluororesin or polyurethane) to pour between the mold 103, and the inner surface 4b and the end surface 5a.

The embodiment exemplifies the electromagnetic flowmeter 1 of a liquid contact type in which the electrodes 9 and 9 contact a fluid to be measured, however, it should not be limited to such an example. The electromagnetic flowmeter 1 can be a non-liquid contact type in which the electrodes 9 and 9 do not contact a fluid to be measured.

Second Embodiment

Figure 5:
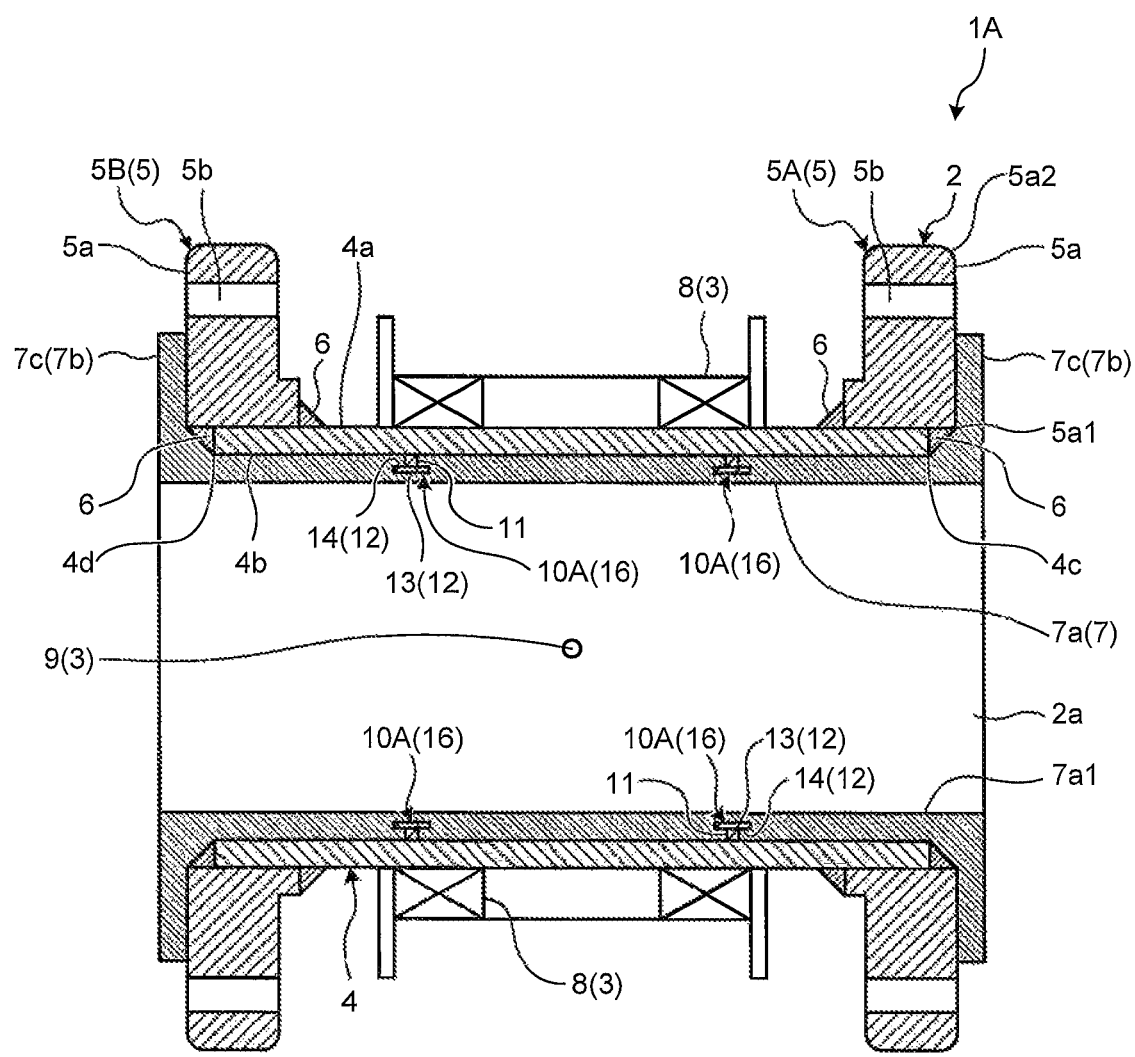
FIG. 5 is a sectional view illustrating an example of an electromagnetic flowmeter according to a second embodiment.

An electromagnetic flowmeter 1A according to an embodiment illustrated in FIG. 5 has the same configuration as that of the electromagnetic flowmeter 1 according to the first embodiment. The embodiment can also attain the same results (effects) as those of the first embodiment.

However, in the embodiment, as an example, protrusions 10A each have a substantial T-shape in a side view (as viewed from the direction connecting the electrodes 9 and 9) as illustrated in FIG. 5. Specifically, each of the protrusions 10A includes the base 11 (the first part) and the hook 12 (the second part). The base 11 protrudes from the inner surface 4b to the inside (inner side, axial center) of the measuring tube 4. The hook 12 includes the protrusion 13. The protrusion 13 is provided at the tip (end close to the flow channel 2a, end close to the axial center) of the base 11, and protrudes in a direction crossing the base 11 (in the embodiment, as an example, an orthogonal direction, the axis direction substantially parallel to the inner surface 4b). The gap 14 (a space, a recess, a cutout, an aperture) is provided between the inner surface 4b and the protrusion 13.

Each of the protrusions 10A can include, as an example, a connector 16 (a tightener, a fastener, a member) that is able to join two members. Examples of the connector 16 include a bolt, a stud, and a rivet. The connector 16 may be a general-purpose one. The connector 16 can be attached on the inner surface 4b of the measuring tube 4 by welding (for example, stud welding) or connecting (for example, screwing) the connector 16.

As described above, in the embodiment, as an example, each of the protrusions 10A can include the connector 16. According to the embodiment, as an example, the electromagnetic flowmeter 1A having a simpler configuration can be realized, reducing works and costs required for manufacturing the electromagnetic flowmeter 1A.

Third Embodiment

Figure 6:
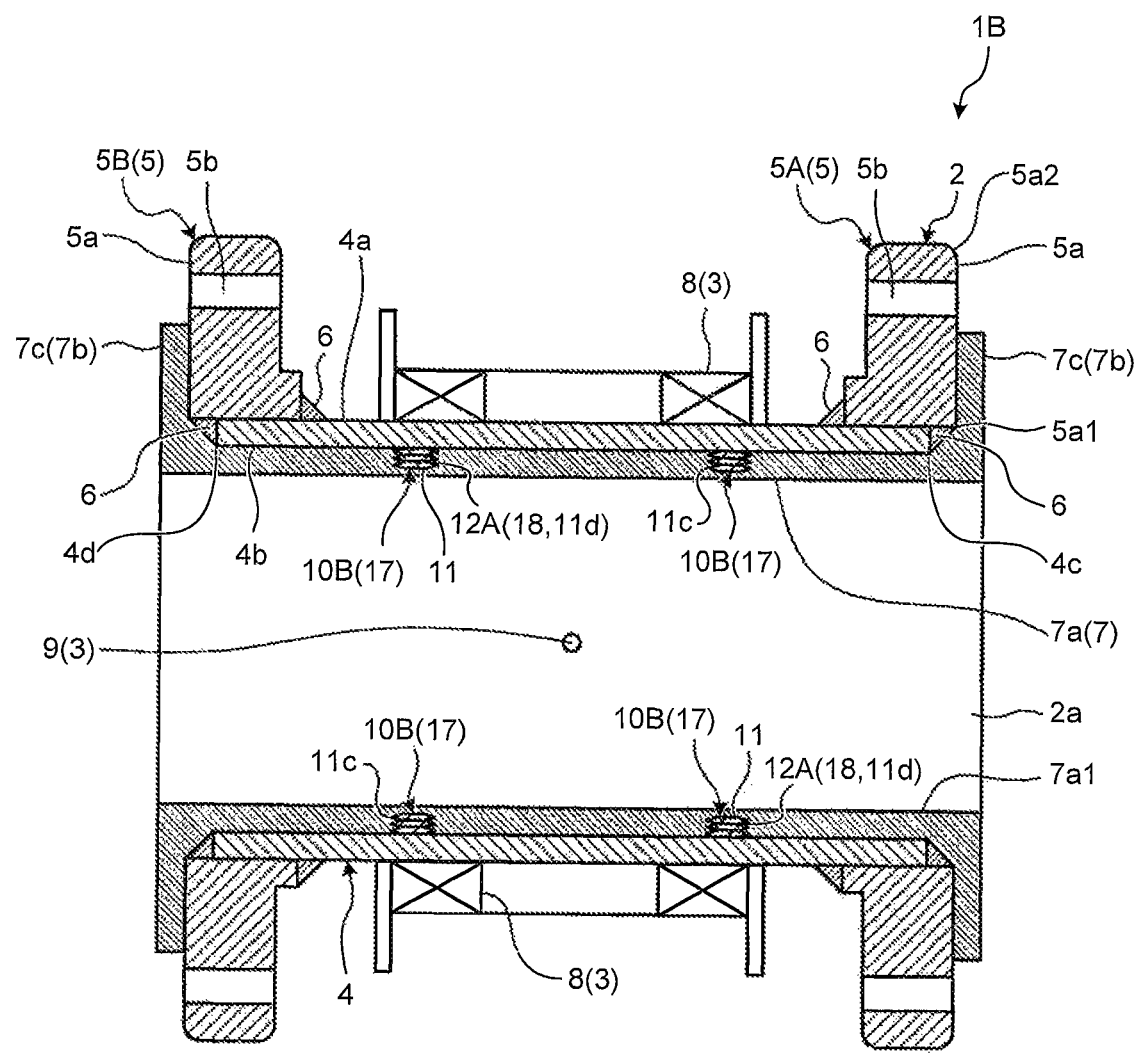
FIG. 6 is a sectional view illustrating an example of an electromagnetic flowmeter according to a third embodiment.

An electromagnetic flowmeter 1B according to an embodiment illustrated in FIG. 6 has the same configuration as that of the second embodiment. The embodiment can also obtain the same results (effects) as those of the second embodiment.

However, in the embodiment, as an example, protrusions 10B each include the base 11 (the first part) and a hook 12A (a second part) as illustrated in FIG. 6. Specifically, the base 11 protrudes from the inner surface 4b to the inside (inner side, axial center) of the measuring tube 4. A groove 18 (recess, aperture) is provided on the base 11. The groove 18 is provided on an outer surface 11c (side surface, peripheral surface) of the base 11 to be open to a direction crossing the base 11 (in the embodiment, as an example, an orthogonal direction, a direction along the inner surface 4b of the measuring tube 4). Further, the base 11 includes a surface 11d (recess surface, groove surface) forming the groove 18. The groove 18 is a space where at least a part of the lining 7 enters (intrudes). The groove 18 and the surface 11d are one example of the hook 12A.

Similarly to the second embodiment, each of the protrusions 10B can be made of, as an example, a connector 17. Examples of the connector 17 include a screw and a bolt. The connector 17 can be a general-purpose one. The connector 17 can be attached on the inner surface 4b of the measuring tube 4 by welding (for example, stud welding).

As described above, in the embodiment, as an example, each of the protrusions 10B can be made of the connector 17. According to the embodiment, as an example, the electromagnetic flowmeter 1B having a simpler configuration can be realized, reducing works and costs required for manufacturing the electromagnetic flowmeter 1B.

Fourth Embodiment

Figure 7:
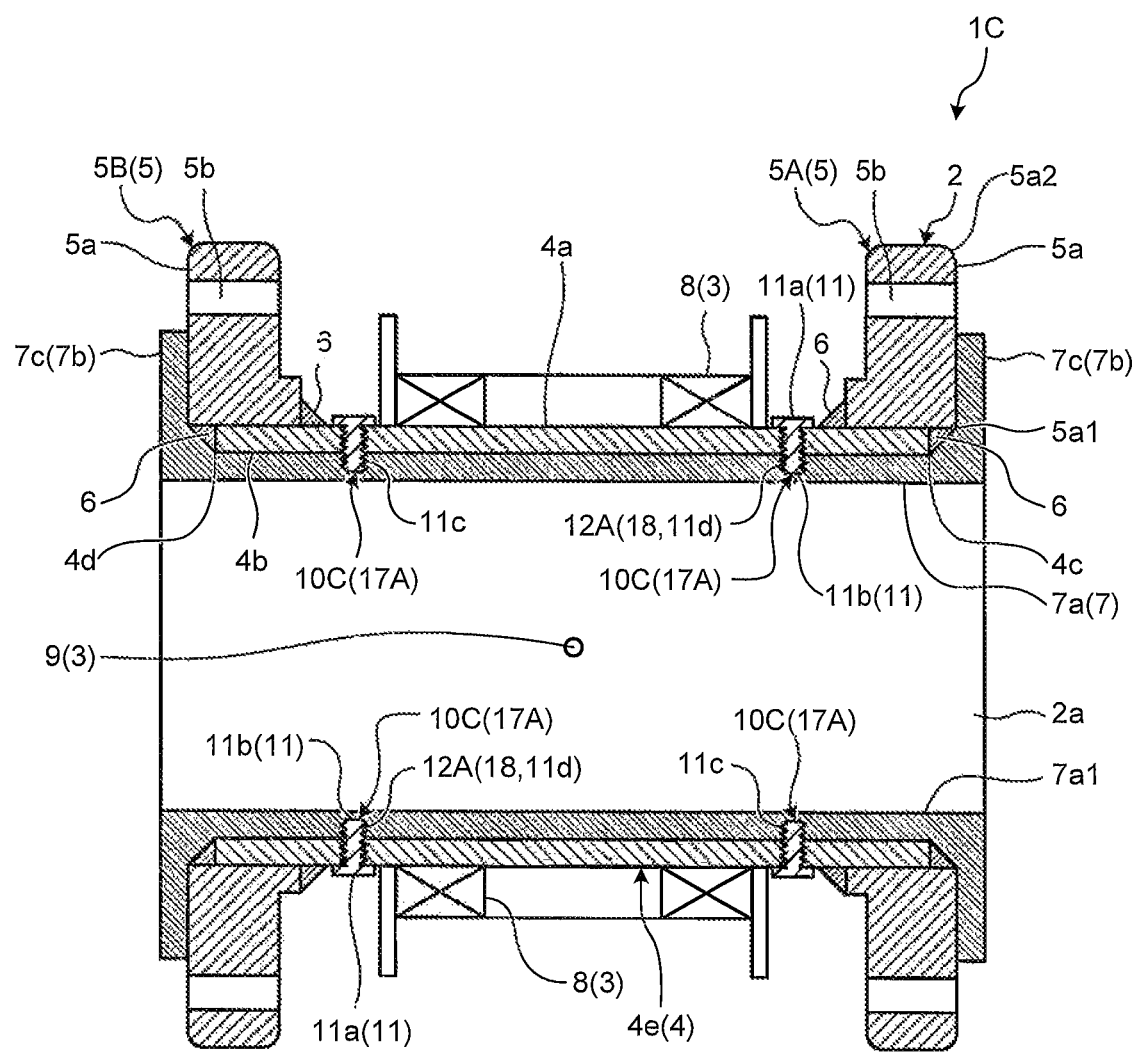
FIG. 7 is a sectional view illustrating an example of an electromagnetic flowmeter according to a fourth embodiment.

An electromagnetic flowmeter 1C according to an embodiment illustrated in FIG. 7 has the same configuration as that of the third embodiment. The embodiment can also attain the same results (effects) as those of the third embodiment.

However, in the embodiment, as an example, protrusions 10C are each attached on the measuring tube 4, penetrating through a wall 4e (tube wall, peripheral wall, side wall) as illustrated in FIG. 7. Specifically, each of the protrusions 10C includes the base 11 (the first part) and the hook 12A (the second part). The base 11 includes the mount (flange) 11a hooked on the outer surface 4a of the measuring tube 4, and the projection 11b penetrating the measuring tube 4 to project from the mount 11a to inside (inner side, axial center) of the measuring tube 4. The base 11 has a substantial T shape by the mount 11a and the projection 11b. The groove 18 (recess, aperture) is provided on the base 11. The groove 18 is provided on the outer surface 11c (side surface, peripheral surface) of the projection 11b to be open to a direction crossing the projection 11b. The projection 11b further includes a surface 11d (recess surface, groove surface) facing the groove 18. The groove 18 is a space where at least a part of the lining 7 enters (intrudes). The groove 18 and the surface 11d is one example of the hook 12A.

Each of the protrusions 10C can include, as an example, a connector 17A. Similarly to the third embodiment, examples of the connector 17A include a screw and a bolt. The connector 17A can be screwed (threadably mounted, engaged) into the measuring tube 4.

As described above, in the embodiment, as an example, each of the protrusions 10C is made of the connector 17A. According to the embodiment, as an example, the electromagnetic flowmeter 1C having a simpler configuration can be realized, reducing works and costs required for manufacturing the electromagnetic flowmeter 1C.

In the embodiment, as an example, the connector 17A (member) is attached on the measuring tube 4, penetrating the wall 4e. According to the embodiment, as an example, attachment of the connector 17A can be performed more easily, resulting in further reducing works and costs required for manufacturing the electromagnetic flowmeter 1C.

Fifth Embodiment

Figure 8:
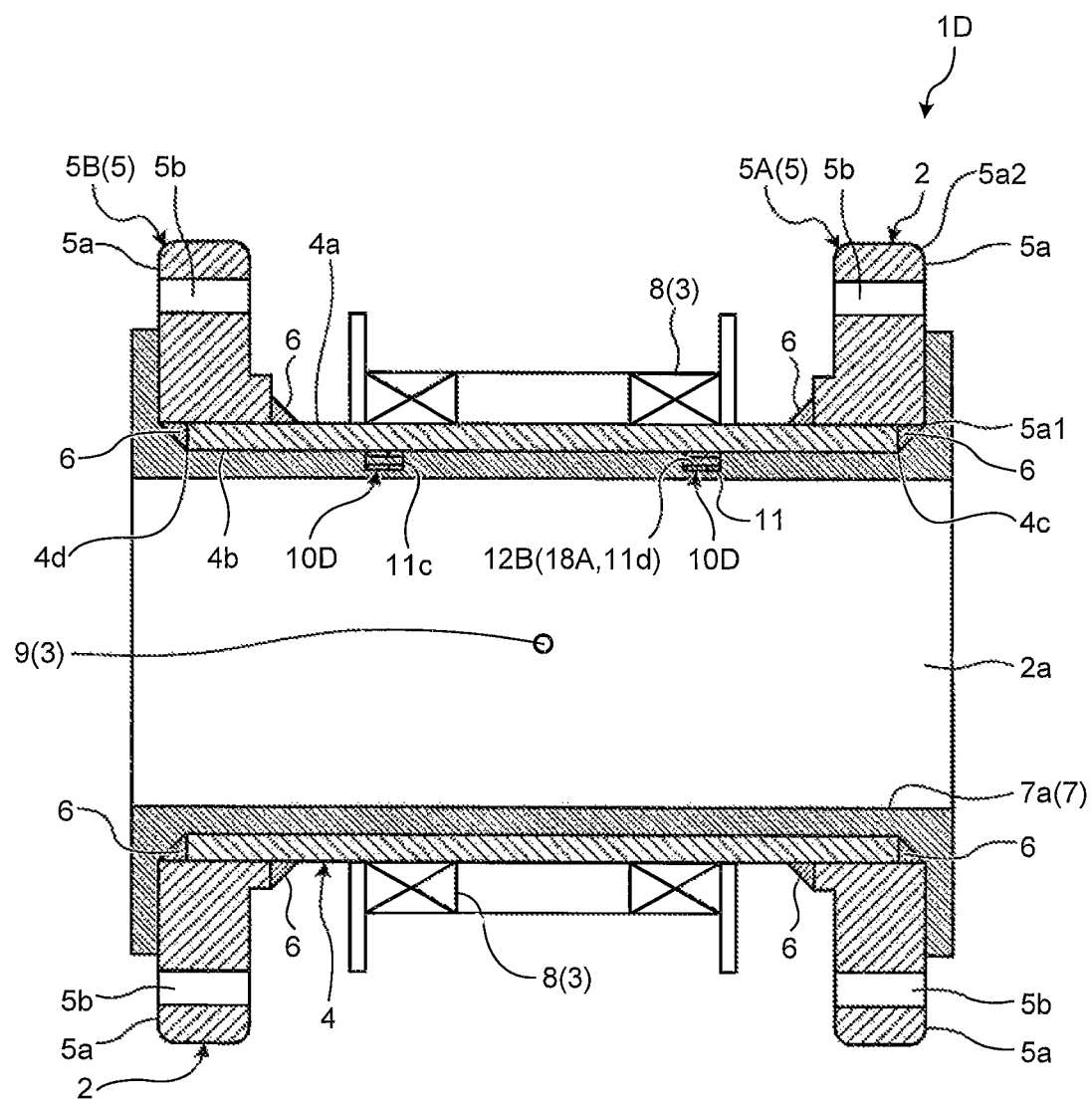
FIG. 8 is a sectional view illustrating an example of an electromagnetic flowmeter according to a fifth embodiment.
Figure 9:
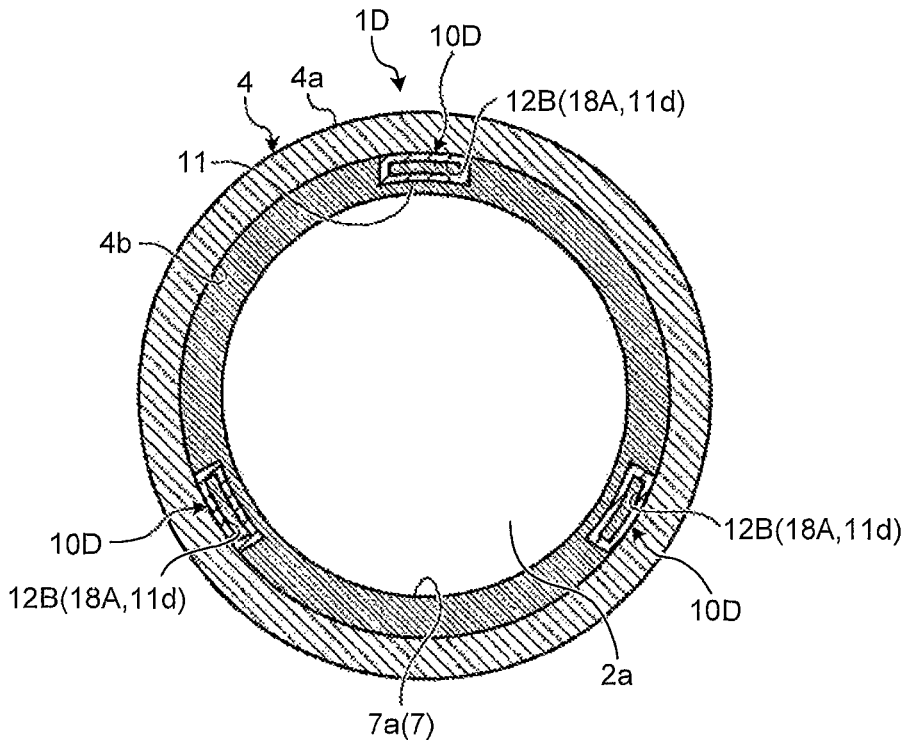
FIG. 9 is a sectional view illustrating a measuring tube in a direction orthogonal to a flow channel in the example of the electromagnetic flowmeter according to the fifth embodiment.

An electromagnetic flowmeter 1D according to an embodiment illustrated in FIGS. 8 and 9 has the same configuration as that of the third embodiment. The embodiment can also attain the same results (effects) as those of the third embodiment.

However, in the embodiment, as an example, protrusions 10D each protrude as a wall (rib) from the inner surface 4b of the measuring tube 4 as illustrated in FIG. 8. Specifically, each of the protrusions 10D includes the base 11 (the first part) and a hook 12B (a second part). The base 11 protrudes from the inner surface 4b to the inside (inner side, axial center) of the measuring tube 4. The base 11 includes an aperture 18A (through hole)). The aperture 18A is provided to penetrate the base 11 in a direction crossing the base 11 (in the embodiment, as an example, orthogonal direction, direction along the inner surface 4b of the measuring tube 4). The base 11 further includes a surface 11d (inner surface, inner side surface, inner peripheral surface) facing the aperture 18A. The aperture 18A is a space where at least a part of the lining 7 enters (intrudes). The aperture 18A and the surface 11d are one example of the hook 12B.

As an example, the protrusions 10D are disposed separately at three spots along the periphery of the measuring tube 4 in a front view of the measuring tube 4 (as viewed from the axis direction) as illustrated in FIG. 9. Specifically, the three protrusions 10D are arranged at equal intervals (at 120 degrees around the axial center) along the periphery of the measuring tube 4 on substantially the same cross section orthogonal to the axial center of the measuring tube 4.

Each of the protrusions 10D can be attached on, as an example, the inner surface 4b of the measuring tube 4 by welding (for example, spot welding or tig welding).

As described above, in the embodiment, as an example, the aperture 18A open to the direction crossing the base 11 (in the embodiment, as an example, an orthogonal direction) is provided in the base 11 of each of the protrusions 10D. According to the embodiment, as an example, the hook 12B and the protrusions 10D can be formed in a relatively simple shape, further reducing manufacturing costs.

In the embodiment, as an example, the protrusions 10D are disposed separately at least at three spots along the periphery of the measuring tube 4 in a front view of the measuring tube 4 (as viewed from the axis direction). According to the embodiment, as an example, the lining 7 is hooked on the hook 12B in a larger (peripheral) area of the measuring tube 4. In this manner, as an example, the lining 7 can be further prevented from being peeled off from the measuring tube 4.

Sixth Embodiment

Figure 10:
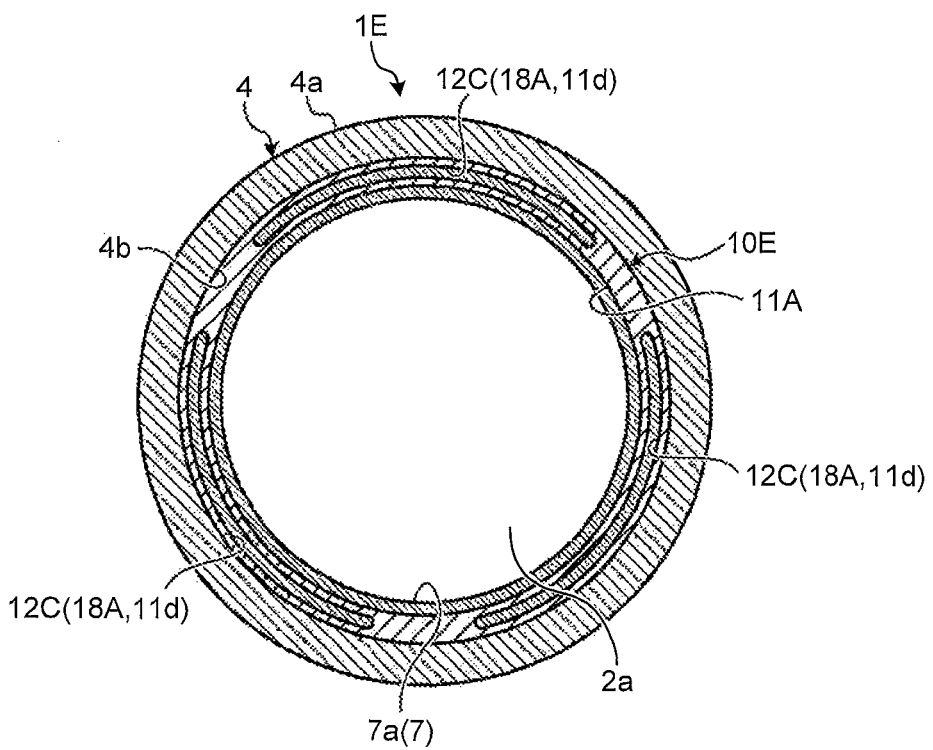
FIG. 10 is a sectional view illustrating a measuring tube in a direction orthogonal to the flow channel in an example of an electromagnetic flowmeter according to a sixth embodiment.

An electromagnetic flowmeter 1E according to an embodiment illustrated in FIG. 10 has the same configuration as that of the fifth embodiment. The embodiment can also attain the same results (effects) as those of the fifth embodiment.

However, in the embodiment, as an example, protrusions 10E are provided over the entire periphery of the measuring tube 4 as illustrated in FIG. 10. Specifically, each of the protrusions 10E includes a base 11A (a first part) and hooks 12C (second parts). The base 11A protrudes from the inner surface 4b to the inside (inner side, axial center) of the measuring tube 4 and extends along the entire periphery of the measuring tube 4. The base 11A includes apertures 18A (through holes). Each of the apertures 18A is provided to penetrate the base 11A in a direction crossing the base 11A (in the embodiment, as an example, orthogonal direction). The base 11A further includes the surface 11d (inner surface, inner side surface, inner peripheral surface) facing the apertures 18A. The apertures 18A are spaces where at least a part of the lining 7 enters (intrudes). The apertures 18A and the surface 11d are one example of the hook 12C.

As an example, the apertures 18A are disposed separately at three spots in the measuring tube 4 in a front view (as viewed from the axis direction). Specifically, the three apertures 18A are disposed at equal intervals (at 120 degrees around the axial center) along the periphery. Each of the three apertures 18A is a long hole extending along the periphery. In the embodiment, a plurality of (in the embodiment, as an example, two) protrusions 10E each including the three apertures 18A are provided separately from each other in the measuring tube 4 in the axis direction. The electrodes 9 and 9 can be provided, as an example, between the two protrusions 10E and 10E that are separated in the axis direction.

Each of the protrusions 10E can be attached on, as an example, the inner surface 4b of the measuring tube 4 by welding (for example, spot welding or tig welding). The protrusions 10E may be integrally formed with the measuring tube 4 in place of a separate member from the measuring tube 4.

As described above, in the embodiment, as an example, the base 11A of each of the protrusions 10E includes the apertures 18A disposed separately at three spots along the periphery of the measuring tube 4 in a front view of the measuring tube 4 (as viewed from the axis direction). Each of the apertures 18A is a long hole extending along the periphery. According to the embodiment, as an example, it is thus possible to further effectively prevent the lining 7 from being peeled off.

Seventh Embodiment

Figure 11:
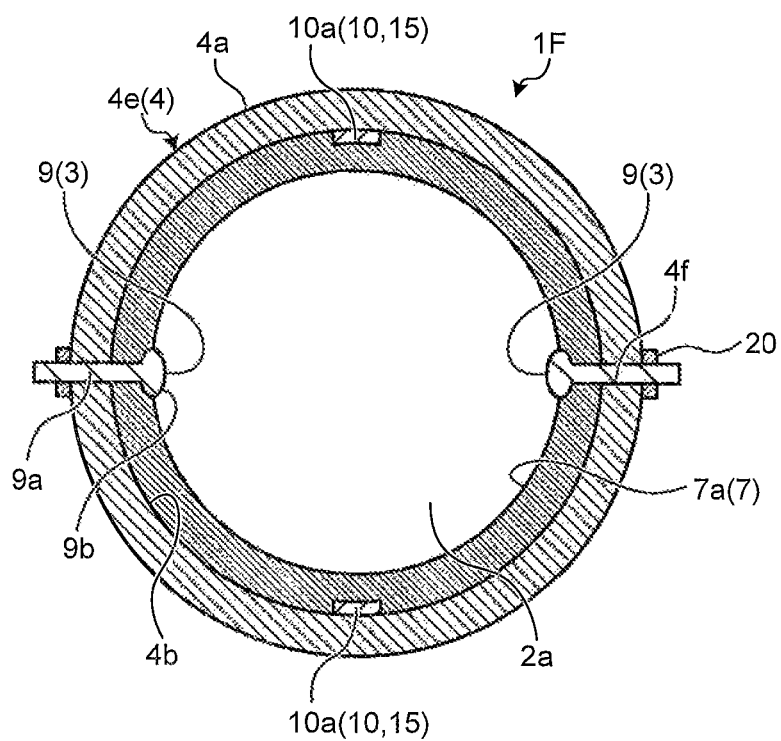
FIG. 11 is a sectional view illustrating a measuring tube in a direction orthogonal to the flow channel in an example of an electromagnetic flowmeter according to a seventh embodiment.

An electromagnetic flowmeter 1F according to an embodiment illustrated in FIG. 11 has the same configuration as that of the first embodiment. The embodiment can also attain the same results (effects) as those of the first embodiment.

However, in the embodiment, as an example, the protrusion 10 and the electrodes 9 and 9 are arranged along the periphery of the measuring tube 4 (on substantially the same cross section) as illustrated in FIG. 11.

Specifically, the protrusion 10 includes two protruding portions 10a and 10a provided separately from the electrodes 9 in a front view of the measuring tube 4 (as viewed from the axis direction). The protruding portions 10a and 10a and the electrodes 9 and 9 are disposed at equal intervals (at 90 degrees around the axial center) along the periphery.

In the embodiment, as an example, each electrode 9 includes a first part 9a and a second part 9b. The first part 9a extends from the inner surface 4b to the inside (inner side, axial center) of the measuring tube 4. The second part 9b is disposed at the tip (end close to the inner side, end close to the flow channel 2a) of the first part 9a, and is a part (electrode) thicker than the first part 9a. The second part 9b exposes to the flow channel 2a and contacts a fluid to be measured.

As an example, the electrodes 9 are a so-called internal insertion type inserted from the inside (inner side, flow channel 2a side) of the measuring tube 4 into apertures 4f (through holes). The electrodes 9 are each attached, penetrating the lining 7 and the wall 4e of the measuring tube 4, and the first part 9a is fixed on the outer surface 4a of the measuring tube 4 with a nut 20. Tightened with the nut 20, the first part 9a is pulled to the outside (outer side) of the measuring tube 4, causing the second part 9b to dig into the lining 7. Thus, the second part 9b of the electrode 9 can also hook the lining 7.

As described above, in the embodiment, as an example, the protrusion 10 includes the two protruding portions 10a and 10a provided separately from the electrodes 9 in a front view of the measuring tube 4 (as viewed from the axis direction). The protruding portions 10a and 10a and the electrodes 9 and 9 are arranged along the periphery of the measuring tube 4 (on substantially the same cross section). According to the embodiment, as an example, not only the protrusion 10 but also the electrodes 9 can hook the lining 7, making it possible to further prevent the lining 7 from being peeled off from the measuring tube 4. In place of the internal insertion electrode, an external insertion electrode (not illustrated) inserted from the outside of the measuring tube 4 can attain the same results (effects) as long as it can hook the lining 7.

The embodiments of the present invention are exemplified, but they are merely examples and are not intended to limit the scope of the invention. These embodiments can be implemented in other various embodiments, and various kinds of omission, replacement, combination, and modification can be made without departing from the gist of the invention. These embodiments are included in the scope and the gist of the invention, and are also included in the invention disclosed in the scope of the claims and equivalents. Specifications (structure, kind, direction, shape, size, length, width, thickness, height, number, disposition, position, material, and the like) for each component can be modified and implemented as appropriate.

What is claimed is:

1. An electromagnetic flowmeter comprising:
   a tube in which a fluid to be measured flows;
   a lining that covers an inner surface of the tube;
   a plurality of protrusions that protrudes from the inner surface and is embedded into the lining and provided separately from each other in an axis direction of the tube, the protrusions each including a hook for hooking the lining; and
   a pair of electrodes positioned between the protrusions as viewed from a direction orthogonal to the axis direction of the tube.

2. The electromagnetic flowmeter according to claim 1, wherein
   the protrusions each include a base that protrudes from the inner surface to inside of the tube, and
   the base includes a projection that protrudes in a direction crossing the base and is disposed separately from the inner surface.

3. The electromagnetic flowmeter according to claim 1, wherein
   the protrusions each include a base that protrudes from the inner surface to inside of the tube, and
   the base includes an aperture open to a direction crossing the base.

4. The electromagnetic flowmeter according to claim 1, wherein the protrusions each include a member attached on the inner surface.

5. The electromagnetic flowmeter according to claim 1, wherein the protrusions each include a member penetrating the tube.

6. The electromagnetic flowmeter according to claim 4, wherein the protrusions each include a connector.

7. The electromagnetic flowmeter according to claim 1, wherein the protrusions each include a member welded on the tube.

8. The electromagnetic flowmeter according to claim 1, wherein
   the protrusions are disposed separately at least at three spots along a periphery of the tube as viewed from the axis direction of the tube.

9. The electromagnetic flowmeter according to claim 1, wherein the protrusions are provided separately from the electrodes as viewed from the axis direction of the tube.

10. The electromagnetic flowmeter according to claim 9, wherein the electrodes and the protrusions are arranged along a periphery of the tube.

11. The electromagnetic flowmeter according to claim 1, wherein the lining is molded by applying pressure to a gelled pellet which is made by filling a pellet between the inner surface and a mold and melting the pellet into a gel.

* * * * *